I. T. LE BARON.
SICKLE WITH SAW ATTACHMENT.
APPLICATION FILED SEPT. 8, 1910.
1,078,152.
Patented Nov. 11, 1913.
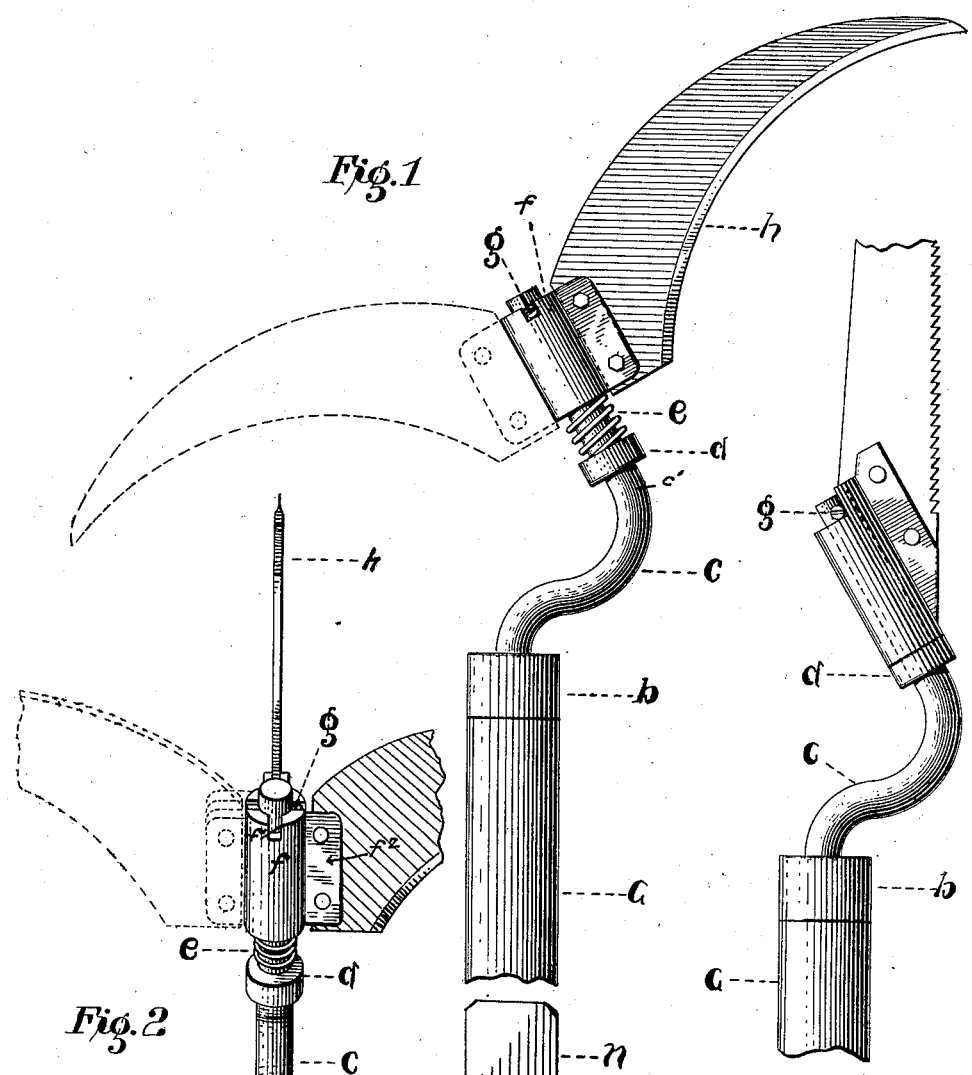
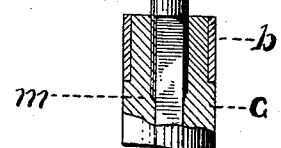
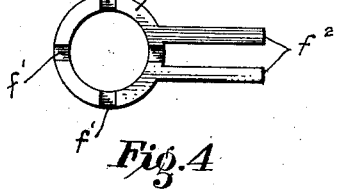

UNITED STATES PATENT OFFICE.

IRVIN T. LE BARON, OF FREDERICKTOWN, MISSOURI.

SICKLE WITH SAW ATTACHMENT.

1,078,152.  Specification of Letters Patent.  Patented Nov. 11, 1913.

Application filed September 8, 1910. Serial No. 581,153.

*To all whom it may concern:*

Be it known that I, IRVIN TAYLOR LE BARON, a citizen of the United States, residing at Fredericktown, in the county of Madison and State of Missouri, have invented a new and useful Sickle with Saw Attachment, of which the following is a specification.

This invention relates to sickles with saw attachment.

The principal object of this invention is to provide a device of this kind which may be used with equal facility for conveniently cutting grass, weeds, shrubbery, etc., or for trimming trees and vines.

A further object of the invention is to provide a device of this kind, having means whereby the cutting blade may be adjusted to four different cutting positions, or may be entirely removed for the substitution of a saw attachment.

In the accompanying drawings:—Figure 1 is a side elevation of a sickle embodying my improvements, the full lines showing the cutting blade in an extended position, and dotted lines indicating the reversed or lowered position of the blade. Fig. 2 is a fragmentary sectional view looking in a direction at right angles to Fig. 1, illustrating three of the four possible cutting positions of the blade. Fig. 3 is a detail view of the outer end of the handle with the saw attachment applied, and Fig. 4 is a detail plan view of the sleeve $f$.

Referring to the drawings for a more particular description of the invention, $a$ indicates the handle of the device constructed of wood or other suitable material, $b$ the usual ferrule on the end of the handle, $c$ the shank of the handle, the inner end of which fits in the body or hand portion of the handle and the outer end of which is of cylindrical form and is bent as shown to form the straight inwardly inclined outer portion $c^1$. Said outer portion $c^1$ is provided with the shoulder $d$ which forms a bearing for the inner end of the coil spring $e$ disposed around the straight portion of the shank with its outer end bearing against the inner end of the blade carrying sleeve $f$. The sleeve $f$ is loosely mounted on the straight portion of the shank and is provided in its outer end with a series of four or more equally spaced notches or recesses $f^1$, any one of which is adapted to receive the screw pin $g$. The sleeve $f$ is provided at one side with a pair of laterally spaced wings $f^2$, between which is received and attached the cutting blade $h$ of the sickle. In Fig. 1 of the drawings the full lines show the extended position of the cutting blade, while the dotted lines indicate the lowered or reversed position thereof.

It will be observed that the tendency of the spring $e$ is to hold one of the notches or recesses $f^1$ of the sleeve in engagement with the screw pin $g$, but that the recess may be disengaged with the sleeve to facilitate the turning of the sleeve on the shank to adjust the cutting blade in another position, by first pressing inwardly on the sleeve against the action of the coil spring to effect the disengagement of said recess with said screw pin.

When the cutting blade is in an extended position as indicated by the full lines in Fig. 1, it may be used with great facility in trimming the outer ends of limbs, vines, etc., with the operator standing on the ground and when in a reversed position as indicated by the dotted lines may be used with equal facility in cutting brush, large weeds, etc.

To substitute the saw attachment shown in Fig. 3 for the cutting blade it is only necessary to remove the screw pin $g$, slide the sleeve $f$ and spring $e$ from position and slip the saw attachment in place.

From the foregoing description taken in connection with the drawings, it is thought that the construction and advantages of this invention will be readily understood without requiring a more extended explanation.

Having described my invention, what I claim as new and desire to secure by Letters Patent, is:—

1. A device of the class described comprising a handle provided with a shank having a straight end portion inclined at an angle to said handle, a blade carrying sleeve revolubly mounted on the straight portion of the shank and provided in its outer edge with a series of four or more notches, a pin screwing in the shank and engageable with any one of the notches of the sleeve, whereby the latter may be held in different adjusted positions, a cutting blade attached to the sleeve and a coil spring to exert a constant pressure on the inner end of the sleeve, whereby any one of the notches in the sleeve may be held in engaged relation with said pin to hold the sleeve and blade in an adjusted position.

2. A device of the class described comprising a handle provided with a shank having a straight end portion inclined at an angle to said handle, a blade carrying sleeve revolubly mounted on the inclined portion of the shank and provided in its outer edge with a series of four or more notches, a pin screwing in the shank and engageable with any one of the notches of the sleeve, whereby the latter may be held in different adjusted positions, a cutting blade attached to the sleeve and a coil spring to exert a constant pressure of the inner end of the sleeve, whereby any one of the notches in the sleeve may be held in engaged relation with said pin to hold the sleeve and blade in an adjusted position, and a shoulder on the straight portion of the shank forming a bearing or seat for the inner ends of the coil spring.

IRVIN T. LE BARON.

Witnesses:
H. CLEAVELAND HORN,
EDWIN COLE.

Copies of this patent may be obtained for five cents each, by addressing the "Commissioner of Patents, Washington, D. C."